(12) United States Patent
Donohue

(10) Patent No.: US 6,199,204 B1
(45) Date of Patent: Mar. 6, 2001

(54) DISTRIBUTION OF SOFTWARE UPDATES VIA A COMPUTER NETWORK

(75) Inventor: Seamus Donohue, Artane (IR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/158,704

(22) Filed: Sep. 22, 1998

(30) Foreign Application Priority Data

Jan. 28, 1998 (GB) .................................................. 9801661

(51) Int. Cl.[7] .................................................. G06F 9/445

(52) U.S. Cl. .................................................. 717/11; 705/59

(58) Field of Search ........................ 717/3, 11; 709/203, 709/216–223; 707/200, 203; 705/26, 27, 57, 58, 59; 713/191, 189

(56) References Cited

U.S. PATENT DOCUMENTS

| | | | |
|---|---|---|---|
| 4,558,413 | 12/1985 | Schmidt et al. ....................... | 364/300 |
| 5,155,847 | 10/1992 | Kirouac et al. ....................... | 395/600 |
| 5,473,772 | * 12/1995 | Halliwell et al. ....................... | 395/712 |
| 5,581,764 | 12/1996 | Fitzgerald et al. ....................... | 395/703 |
| 5,752,042 | * 5/1998 | Cole et al. ............................ | 395/712 |
| 5,778,231 | 7/1998 | Hoff et al. ............................ | 395/705 |
| 5,797,016 | 8/1998 | Chen et al. ............................ | 395/712 |
| 5,809,251 | * 9/1998 | May et al. ............................. | 709/223 |
| 5,845,090 | * 12/1998 | Collins, III et al. ................. | 709/221 |
| 5,845,293 | 12/1998 | Veghte et al. ......................... | 707/202 |
| 5,859,969 | * 1/1999 | Oki et al. ........................... | 395/200.3 |
| 5,867,714 | * 2/1999 | Todd et al. ............................ | 395/712 |
| 5,870,610 | * 2/1999 | Beyda ................................. | 395/712 |
| 5,881,236 | * 3/1999 | Dickey ................................. | 709/221 |
| 5,933,647 | 8/1999 | Aronberg et al. ..................... | 395/712 |
| 5,983,241 | 11/1999 | Hoshino ................................ | 707/203 |
| 5,991,771 | 11/1999 | Falls et al. ........................... | 707/202 |
| 5,999,740 | * 12/1999 | Rowley ................................. | 395/712 |
| 5,999,947 | 12/1999 | Zollinger et al. ..................... | 707/203 |
| 6,006,034 | 12/1999 | Heath et al. .......................... | 395/712 |

FOREIGN PATENT DOCUMENTS

| | | |
|---|---|---|
| 2 321 322 | 7/1998 | (GB) . |
| WO 92/22870 | 12/1992 | (WO) . |
| WO 94/25923 | 11/1994 | (WO) . |
| WO98/07085 | 2/1998 | (WO) . |

OTHER PUBLICATIONS

Marimba Products "Castanet" from http://www.marimba.com/products website, p. 1.

Novadigm Fact Sheet, Novadigm's EDM from http://www/novadigm.com/cb5.htm website pp. 1 and 2, and http://www.novadigm.com/cb2.htm website, pp. 1 and 2.

"Internet Finalist: Castanet", Castanet Development Team, from http://www.zdnet.com/...ts/content/pcmg/1622/pcmg0079.html website, 1997 p. 1.

(List continued on next page.)

Primary Examiner—Kakall Chaki
(74) Attorney, Agent, or Firm—Jeanine S. Ray-Yarletts

(57) ABSTRACT

Provided is a method and mechanism for automating updating of computer programs. Conventionally, computer programs have been distributed on a recording medium for users to install on their computer systems. Each time fixes, additions and new versions for the programs were developed, a new CD or diskette was required to be delivered to users to enable them to install the update. More recently some software has been downloadable across a network, but the effort for users obtaining and installing updates and the effort for software vendors to distribute updates remains undesirable. The invention provides an updater agent which is associated with a computer program and which accesses relevant network locations and automatically downloads and installs any available updates to its associated program if those updates satisfy predefined update criteria of the updater agent. The updater agents are able to communicate with each other and so a first updater agent can request updates to programs which are prerequisites to its associated program.

9 Claims, 5 Drawing Sheets

OTHER PUBLICATIONS

"Review: Marimba Castanet 3.0", Bradley F Shimmon, from http://www/lantimes.com/testing/98aug/808c011a.html website, 1998, pp. 1–4.

Pell et al "Mission Operations with and Automous Agent" Aerospace Conference, 1998 IEEE, Mar. 21–28, 1998, vol. 2, pp. 289–313.

Yeung et al "A Multi–Agent Based Tourism Kiosk on Internet" Proceedings of the Thirty–First Hawaii Int'l Conf on System Sciences, Jan 6–8, 1998, vol. 4, pp. 452–461.

Computer Database record 02071725 of Home Office Computing, v15, n5, p66(5), May 1997, D Haskin, "Save time while you sleep (round–the–clock computing chores)".

Computer Database record 02046777 of Computer Shopper, v16, n4, p568(5), Apr. 1997, D Aubrey, "Changing channels (Internet broadcasting)".

Computer Database record 02046764 of Computer Shopper, v16, n4, p540(2), Apr. 1997, L Bailes, "First Aid 97: a good does of preventive medicine (Cybermedia First Aid 97)".

Automating Internet Service Management, "The First Distributed Object–Oriented Automation Environment for Managing Internet Services", James Herman, Northeast Consulting Resources Inc.

* cited by examiner

| PRODUCT SET | UPDATE RESOURCES | PREREQUISITES |
|---|---|---|
| SOFTProd1 v1.0.0 | — | OPER.SYST3 v2.0 |
| SOFTProd1 v1.0.1 | Patch1 for SOFTProd1 | OPER.SYST3 v2.0 |
| SOFTProd1 v2.0.0 | Patch2 for SOFTProd1 | OPER.SYST3 v2.0 |
| SOFTProd1 v3.0.0 | SOFTProd1 v3.0.0 (replacement) | OPER.SYST3 v2.0 |
| SOFTGame2 v1.0 | — | OPER.SYST3 v2.0 |
| SOFTGame2 v2.0 | Patch1 for SOFTGame2 | OPER.SYST3 v3.0 |
| SOFTGame2 v3.0 | Patch2 for SOFTGame2 | OPER.SYST3 v3.0 |

FIG. 2

DISTRIBUTION OF SOFTWARE UPDATES VIA A COMPUTER NETWORK

FIELD OF INVENTION

The present invention relates to distribution of software via a computer network and to a mechanism for accessing software enhancements, corrections or new versions via a computer network. A 'network' of computers can be any number of computers that are able to exchange information with one another, and may be arranged in any configuration and using any manner of connection.

BACKGROUND

Software has conventionally been distributed in the form of programs recorded on a recording medium such as a diskette or compact disk. Customers buy the recording medium and a licence to use the software recorded on the medium, and then install the software onto their computers from the recording medium. The manufacture and distribution of the pre-recorded recording media are expensive, and this cost will be passed on to the customer. Also, the effort for customers of ordering or shopping for the software is undesirable.

The distribution cost is particularly problematic because most software products are frequently updated, both to correct bugs and to add new features, after the software has been delivered to the user. Some types of software products are updated many times each year. The cost of sending a new diskette or CD to all registered customers every time the software is upgraded or corrected is prohibitive and, although many customers want their software to be the most up-to-date, highest performance version and to be error free, not all customers want to receive every update. For example, the vendor may charge more for updates than the customer wants to spend, or new versions may require upgrading of other pre-requisite software products which the customer does not want to buy, or migrating to new versions may require migration of data which would disable the customer's system for a period of time.

Thus, software vendors tend to publicise the availability of new versions of their software and leave it for the customer to decide whether to purchase the latest upgraded version. For some software products, however, it is appropriate for the software vendor to proactively send out upgraded versions, or at least error correction and enhancement code (known as "patches") for their software products. Whatever a particular company's policy, significant costs and effort are involved in releasing these various types of software updates.

Increasingly, software distributors are using the Internet as a mechanism for publicising the availability of updates to their software, and even for distributing some software. The Internet is a network of computer networks having no single owner or controller and including large and small, public and private networks, and in which any connected computer running Internet Protocol software is, subject to security controls, capable of exchanging information with any other computer which is also connected to the Internet. This composite collection of networks which have agreed to connect to one another relies on no single transmission medium (for example, bidirectional communication can occur via satellite links, fiber-optic trunk lines, telephone lines, cable television wires and local radio links).

The World Wide Web Internet service (hereafter 'the Web') is a wide area information retrieval facility which provides access to an enormous quantity of network-accessible information and which can provide low cost communications between Internet-connected computers. It is known for software vendors, customers who have Internet access to access the vendors' Web sites to manually check lists of the latest available versions of products and then to order the products on-line. This reduces the amount of paperwork involved in ordering software (and is equally applicable to other products). Some companies have also enabled their software to be downloaded directly from a Web site on a server computer to the customer's own computer (although this download capability is often restricted to bug fixing patches, low cost programs, and demonstration or evaluation copies of programs, for security reasons and because applying patches tends not to require any change to pre-requisite software or any data migration).

Information about the World Wide Web can be found in "Spinning the Web" by Andrew Ford (International Thomson Publishing, London 1995) and "The World Wide Web Unleashed" by John December and Neil Randall (SAMS Publishing, Indianapolis 1994). Use of the WWW is growing at an explosive rate because of its combination of flexibility, portability and ease-of-use, coupled with interactive multimedia presentation capabilities. The WWW allows any computer connected to the Internet and having the appropriate software and hardware configuration to retrieve any document that has been made available anywhere on the Internet.

This increasing usage of the Internet for ordering and distribution of software has saved costs for software vendors, but for many software products the vendor cannot just rely on all customers to access his Web pages at appropriate times and so additional update mechanisms are desirable.

As well as the problem of manufacture and distribution cost associated with distributing media, there is the problem that customers typically need to make considerable proactive effort to find out whether they have the best and the latest version and release of a software product and to obtain and apply updates. Although this effort is reduced when Internet connections are available, even a requirement for proactive checking of Web sites is undesirable to many users since it involves setting up reminders to carry out checks, finding and accessing a software provider's Web site, navigating to the Web page on which latest software versions and patches are listed, and comparing version and release numbers within this list with the installed software to determine whether a relevant product update is available and to decide whether it should be ordered. There may be an annoying delay between ordering an update and it being available for use, and even if the update can be downloaded immediately the task of migrating to an upgraded version of a software product can be difficult. If these steps have to be repeated for every application, control panel, extension, utility, and system software program installed on the system then updating becomes very tedious and time consuming. Therefore, manual updating tends not to be performed thoroughly or regularly.

There is the related problem that software vendors do not know what version of their software is being used by each customer. Even if the latest version of their software has been diligently distributed to every registered customer (by sending out CDs or by server-controlled on-line distribution), there is still no guarantee that the customer has taken the trouble to correctly install the update. This takes away some of the freedom of software developers since they generally have to maintain backward compatibility with previous versions of their software or to make other concessions for users who do not upgrade.

It is known in a client-server computing environment for a system-administrator at the server end to impose new versions of software products on end users at client systems at the administrator's discretion. However, this has only been possible where the administrator has access control for updating the client's system. This takes no account of users who do not want upgrades to be imposed on them.

Yet a further related problem is that software products often require other software products to enable them to work. For example, application programs are typically written for a specific operating system. Since specific versions of one product often require specific versions of other products, upgrading a first product without upgrading others can result in the first product not working.

"Insider Updates 2.0" is a commercially available software updater utility from Insider Software Corporation which, when triggered by the user, creates an inventory of installed software on a user's Apple Macintosh computer and compares this with a database of available software update patches (but not upgraded product versions) and downloads relevant updates. "Insider Updates" shifts the responsibility for finding relevant updates from the user to the database maintainer, but the access to update patches is limited to a connection to an individual database and the tasks of scanning the Internet and on-line services to find updates and of maintaining the database of available updates require significant proactive effort. "Insider Updates" does not install the updates or modify the user's software in any way. "Insider Updates" does not address the problem of unsynchronised prerequisite software products.

A similar product which scans selected volumes of a computer system to determine the installed software and which connects to a database of software titles for the Apple Macintosh, but does not download updates, is Symmetry Software Corporation's "Version Master 1.5".

An alternative update approach is provided by "Shaman Update Server 1.1.6" from Shaman Corporation, which consists of: a CD-ROM (updated and distributed monthly) that users install on a PowerMac file server; client software for each Macintosh computer to be inventoried and updated; and means for accessing an FTP site storing a library of current updates. "Shaman Update Server" creates an inventory of networked computers and downloads and distributes latest versions of software to each computer. Network administrators centrally control this inventory and updating process. The distribution of CD-ROMs has the expense problems described earlier.

SUMMARY OF INVENTION

According to a first aspect of the invention, there is provided an updater component for use in updating one or more computer programs installed on a computer system connected within a computer network, the updater component including:

information for identifying one or more locations within the network where one or more required software resources are located;

means for initiating access to the one or more locations to retrieve the one or more required software resources; and means for applying a software update to one of said installed computer programs using the one or more retrieved software resources.

An updater component according to the invention preferably controls upgrading of, and fixing of bugs within, an associated software product or products automatically without requiring any interaction by the user after an initial agreement of update criteria. The update criteria can be associated with the products' licensing terms and conditions. This ensures that users who adopt a suitable update policy can always have the most up-to-date software available, with errors being corrected automatically from the viewpoint of the user. The user does not need to know where software updates come from, how to obtain them or how to install them since the update component takes care of this. The software vendor avoids having to ship special CDs or diskettes to correct errors or provide additional features; the vendor can easily release code on an incremental basis such that customers receive new product features sooner and with no effort.

An updater component according to a preferred embodiment of the invention performs a comparison between available software updates and installed software on the local computer system to identify which are relevant to the installed software, compares the available relevant updates with update criteria held on the local computer system (these update criteria are predefined for the current system or system user), and then automatically downloads and applies software updates which satisfy the predefined criteria.

This automatic applying of software updates preferably involves installing available software patches and/or upgraded versions in accordance with both the predefined update criteria and instructions for installation which are downloaded together with the program code required for the update. This feature of executing dynamically downloaded instructions provides flexibility in relation to the types of updates that can be handled by an updater component. It can also be used to enable a single generic updater component to be used with many different software products. Alternatively, the installation instructions for certain software updates may be pre-coded within the updater component. The "software resources" are typically a combination of program code, machine readable installation instructions and any required data changes such as address information.

The information for use in identifying a network location may be explicit network location information or it may be a software vendor name or any other information which can be used as a search parameter for identifying the location. In the preferred embodiment, the information is a product identifier which is provided by the updater component to a search engine to initiate a search to identify the relevant network location at which are stored the software resources for implementing updates to that product. This search may be performed by a conventional Internet (or other network) search engine which is called by the updater component. When the search engine returns an identification of the network location, the updater component retrieves from this location a list of available relevant updates, checks the list against the locally held software product version and against predefined update criteria, and retrieves the update resources onto the local computer system if those criteria are satisfied.

According to a preferred embodiment of the invention, a standardised naming convention is used for software resources from which to build software updates, and the updater component can search for these resources on a Network Operating System filesystem. This allows software resources to be stored at multiple locations to mitigate against network availability problems and makes it easier for developers and distributors to provide their error-fixing patches and upgraded versions of software products. For example, a developer can make new software updates available via a public network disk drive on their LAN using a known filename or via a published Uniform Resource Locator (URL) which can be searched for using known key words.

Updater components are preferably an integral part of the products they will serve to update. Hence, the updater component is distributed to software users together with an initial version of a software product, the updater component then automatically obtaining and applying software updates in accordance with preset criteria (such as a time period between successive searches for updates, and whether the particular user has selected to receive all updates or only certain updates—such as to receive updating patches but not replacement product versions for example).

The updater component's update capability preferably includes updating itself. Indeed, the update criteria may be set such that the updater component always accesses appropriate network locations to obtain updates to itself before it searches for software resources for updating its associated software products.

An updater component according to the invention preferably includes means for checking whether pre-requisite products are available, and are synchronised to the required version, as part of the process of selecting an update path for the current product. In a preferred embodiment, as well as checking their availability, the updater component is capable of instructing the updater components associated with pre-requisite software products to initiate updates to their software where this is the agreed update policy. If each software product's updater component is capable of triggering updates to pre-requisite products, then updates can ripple through the set of installed software products without the user having to be involved in or aware of the updates. This capability is a significant advantage over prior art updater agents which do not deal with the problem of unsynchronised software versions when one updates, and supports the increasing trend within the software industry for collaboration between distributed objects to perform tasks for the end user.

The updater component preferably also includes a mechanism for verifying the authenticity of downloaded software, using cryptographic algorithms. This avoids the need for dedicated, password-protected or otherwise protected software resource repository sites. The software resources can be anywhere on the network as long as they are correctly named and or posted to the network search engines.

Thus, the present invention provides an agent and a method for obtaining and applying software updates which significantly reduces the cost and effort for software distributors of distributing and tracking software updates and significantly reduces the effort for system administrators and end users of applying updates to installed software.

BRIEF DESCRIPTION OF DRAWINGS

The present invention will now be described in more detail, by way of example only, with reference to the accompanying drawings in which:

FIG. 2 is an example of a software vendor's list of their software versions and the resources and prerequisites for building from one version to another;

DETAILED DESCRIPTION OF PREFERRED EMBODIMENTS

Figure 1:
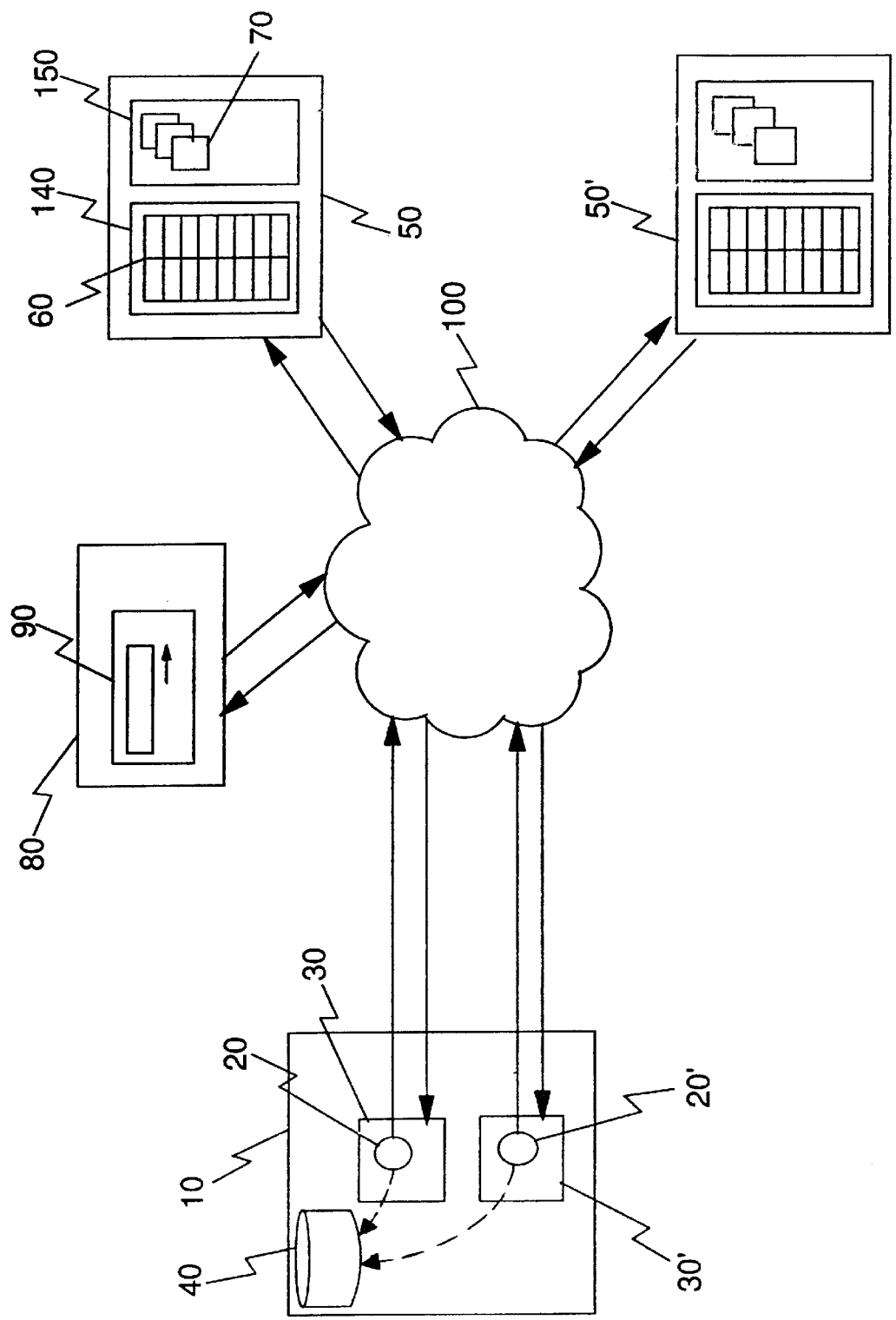
FIG. 1 is a schematic representation of a computer network including a local computer system having an installed updater component, server computers storing lists of available updates and storing software resources for applying updates, and a search engine for locating the servers.

As shown in FIG. 1, an updater component 20 is installed in system memory of a conventional network-connected computer system 10, together with an associated computer program 30. The updater component may have been delivered to the user of the local computer system on a storage medium (diskette or CD) for him to install, or it may have been explicitly downloaded from another computer system. In preferred embodiments of the invention, updater components are integrated within the computer program they are intended to maintain (or are otherwise delivered via the same mechanism and at the same time as their associated program). The updater component is then installed as part of the installation procedure of its associated program, such that the user is not required to take any special action to obtain or activate it. The installation of each updater component includes the updater component registering itself with the operating system (more generally, updaters register with a repository 40, which may be central or distributed), such that at least the updater components on the local system are identifiable and contactable by address information, and/or their product identifier, within the register entry.

It is a feature of the preferred embodiment of the invention that each updater component can locate, can be located by, and can communicate with other updater components which manage other software products. This capability is used when one updater component requires another one to update to a specific level before the former can execute its own update, as will be discussed below. This is enabled by the updater components registering within the operating system or other repository 40.

In the preferred embodiment, each registration entry contains two items: the updater path and the updater network address. The path is the location of the updater component binary file so that the updater component can be launched by the operating system during the boot up process. This ensures that the updater component is always active and ready to perform work or handle requests issued to it from other updater components. The network address is the address used by components on other computer systems in the network to locate it on the network and to communicate with it.

An example of such registration using a UNIX (TM) operating system and the TCP/IP protocol suite uses the following naming convention for updater components: SoftwareVendorName+_product_name+_updater.

Path registrations can be entered in the UNIX/etc/inittab file to store the path entry. When, for example, the updater component for IBM Corporation's DB2 (TM) database product is installed it will add an entry to the /etc/inittab file of the form:
ibm_db2pe_updater:2:respawn:/usr/abin/db2_updater_binary Every time the computer system reboots it will read this file and launch the DB2 updater component. The "respawn" keyword in the updater entry ensures that, should the updater component process fail for some reason during general system operation, it will be restarted by the operating system automatically. This approach will ensure that all updater components for all installed applications are always active.

Network Location registrations can be entered in the UNIX/etc/services file. For example when the DB2 updater component is installed it will add an entry to the /etc/services file of the form:
ibm_db2pe_updater 5000/tcp #net location of DB2 updater component When another updater component wishes to communicate with the DB2 updater component it will find it by searching this file for the DB2 updater component name ibm_db2pe_updater (actually done indirectly by the UNIX call getservbyname()—the name is built by the caller according to the standard naming convention). When it is found it knows that the DB2 updater is listening for connections on port number 5000 and will use the TCP protocol. This allows the updater component in question to establish a link to the DB2 updater component and start a conversation (described later).

For an updater component to find and talk to another updater component on another remote machine the above information would have to be augmented by having a repository 40' which is accessible from both machines (preferably a central or distributed database accessible from anywhere in the network, such as a Web Page or pan-network file) and is available to all updater components that require it. Entries would be of the form updater_name machine_ip_address (OR DNS entry), port number, protocol.

For example, the manufacturing department of an organisation may have three computer systems on which distributed software products collaborate with each other, the systems being called a, b and c. Typical entries in the Web page or file manufacturing_collaborators.html might be:
ibm_catia_updater a.manufacturing.com 5000 tcp
ibm_db2pe_updater b.manufacturing.com 5100 tcp
ibm_cics_updater c.manufacturing.com 4780 tcp An updater component can then connect and talk to any other updater component using the DNS name to create an IP address and the port number which the remote updater component is listening to at that address.

The steps of updater registration at installation are therefore:

1) Create entry in /etc/inittab file (register updater process code location)
2) Create entry in /etc/services file (register updater process local address)
3) Create entry in central database file (register updater process pan-network address).

The installation process may also involve providing to the updater component the local IP address of a Web proxy server. It will be clear to persons skilled in the art that many alternative registration implementations are possible.

Updater components include data fields for an identifier and version number for their associated software products. The updater components may be delivered to customers with these fields set to null values, and then the installation procedure includes an initial step of the updater component interrogating its software product to obtain an identifier and current program version and release number. Alternatively, the software vendor may pre-code the relevant product ID and version number into the updater component.

The system 10 of FIG. 1 is shown connected within a network 100 of computers including a number of remote server systems (50,50') from which software resources are available for applying updates to programs installed on the local system 10. Each server system includes within storage a list 60 of the latest versions of, and patches for, software products which are available from that server. Each vendor is assumed here to make available via their Web sites such a list 60 of software updates (an example of which is shown in FIG. 2) comprising their product release history, in a format which is readable by updater components, and to make available the software resources 70 required to build the releases from a given level to a new level (this transition from a software product release to a new level will be referred to hereafter as a 'growth' path). The entries in the software updates list 60 include for each software product version 110 an identification 120 of the software resources required for applying the update and an identification 130 of its prerequisite software products and their version numbers. In some cases, the required resources are complete replacement versions of software and associated installation instructions. In other cases, the resources comprise patch code for modifying an existing program (e.g. for error correction) and the patch's installation instructions.

For the current example, we will assume that the network 100 is the Internet, although the invention may be implemented within any computer network. Also shown within the network 100 is a server system 80 on which a search engine 90 is installed for use in finding update source locations on the network. This is shown located remotely from the local system 10, although it need not be. In the Figure, each updater component 20 is shown associated with a single program 30, and it is a feature of this embodiment of the invention that all installed software products have associated updater components which manage them, but neither of these features is essential to the invention as will be explained later.

The operation of an updater component will now be described, with reference to FIGS. 3 and 4. When an installed updater component executes, its first action is to initiate 200 a search for available updates to the particular software product, providing to one or more search engines 90 as search arguments the product identifier and product version release number obtained at install time. Assuming that software vendors provide via their Web sites a list 60 of available product updates referenced by product identifier and release number 110 (or some other consistent naming convention is used), the search should identify the relevant Web site 140 on which update information is available. If the initial attempt to start a search engine is unsuccessful, then the updater component will attempt to start a different search engine (which may be in a different geographical location to the first), but could alternatively wait for a preset time period and then retry. A URL identifying the relevant Web site 140 for update information is returned 210 to the updater component as a result of the search.

The updater component uses the URL to access 220 the list 60 and downloads 230 a file 160 comprising the portion of the list 60 of available updates which relates to the particular product. The updater component then performs steps 240–280 as shown in FIG. 4. Each file 160 contains message digests (e.g. MD5) which are digitally signed. The retrieved file 160 is then analyzed 240 using a digital signature checking algorithm (such as the algorithm described in U.S. Pat. No. 5,231,668). This is important to verify that the file 160 represents the correct software updates list for the particular software product, and that the file has not been tampered with since signing. Also, checking for the digital signature is a useful way of filtering the results of the search since these may include a plurality of Web page URLs other than the correct one (the search may find other pages which have a reference to the named product version, including pages not published by the software vendor). If an attempt to download and verify a file is not successful, then the updater component moves on to the next URL found in the search.

The updater component then performs on the local computer system a comparison 250 between the current installed software product's identifier and release number and the listed available updates in the retrieved file 160. This comparison determines possible growth paths from the current to updated versions, but these possible growth paths are then compared 260 with predefined update criteria, and any possible paths which do not satisfy the update criteria are discarded. Thus, the updater component determines whether it is possible to migrate from a current software product to the available new versions and whether it is possible to apply patches to the current version under the currently agreed licence terms and conditions.

For example, the software product licence may enable migration to any future version of the product and application of any available patches, or only migration up to a specified version, or it may only permit applying of available patches which modify or correct errors in the current version. Possible update paths which are unavailable due to current license limitations are notified 270 as a system generated message sent to the software asset manager (who may be an end user or IT procurement manager) of the currently installed version, to enable them to make decisions about whether the current licence is adequate.

As well as licence restrictions as to the updates that are possible, an updater component's update criteria or growth policy includes a cycle period (for example weekly or monthly) and criteria for determining which of a plurality of possible growth paths to select (such as always select latest version permitted by licence, or always select latest patch and only notify availability of new versions, or only select new versions if prerequisite software is already available on local system). The growth criteria may also include control information such as when to upgrade to new versions that are downloaded by the updater component—if data migration is required when migrating to a new software product version it may be essential for this to be done outside of office hours or only at a single scheduled time each month or each year and this can be controlled by the updater component.

The growth policy definition may also include a parameter determining that updating of pre-requisite software products should be requested when required to maintain synchronisation with the current product. This will be described in more detail below. Persons skilled in the art will appreciate that there is great flexibility in the criteria that can be set and applied by the updater component.

The updater component then decides 280 on a particular growth path (i.e. which available version to upgrade to) from the set of possible growth paths using the update criteria. For example, the updater component may select the highest possible version or release number of the available updates which is permitted by the update criteria, if that is the update policy.

The updater component performs 290 (see FIGS. 3 and 4) a scan of the operating system file system to check whether the required software resources are already available on the local computer system. The required resources are the software update artifacts required to bring the current application software to the new level, and the software updates required for updating pre-requisite software to required levels. Each updater component associated with pre-requisite installed products is contacted 300 to ensure (a) that it is installed, and (b) that it is at or greater than the required pre-requisite level. If all required resources are available locally or on another machine (in the case of software relying on some pre-requisite software operating on a remote machine), and have been verified, then the updater component progresses to the step 310 (see FIG. 4) of building the updated software version. If not, the update component must obtain the required resources.

Figure 3:
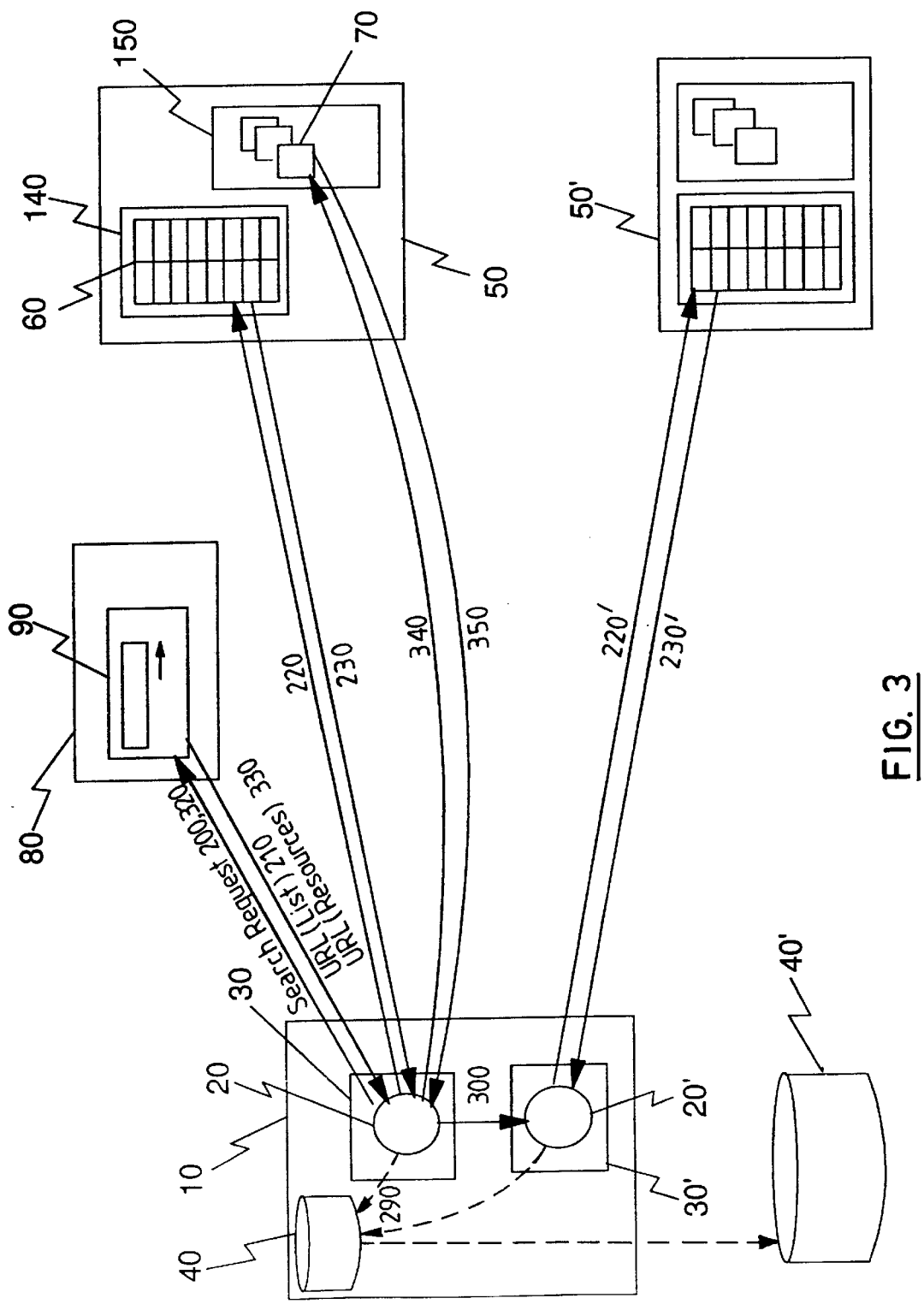
FIG. 3 represents the sequence of operations of an updater component according to an embodiment of the invention.
Figure 4A:
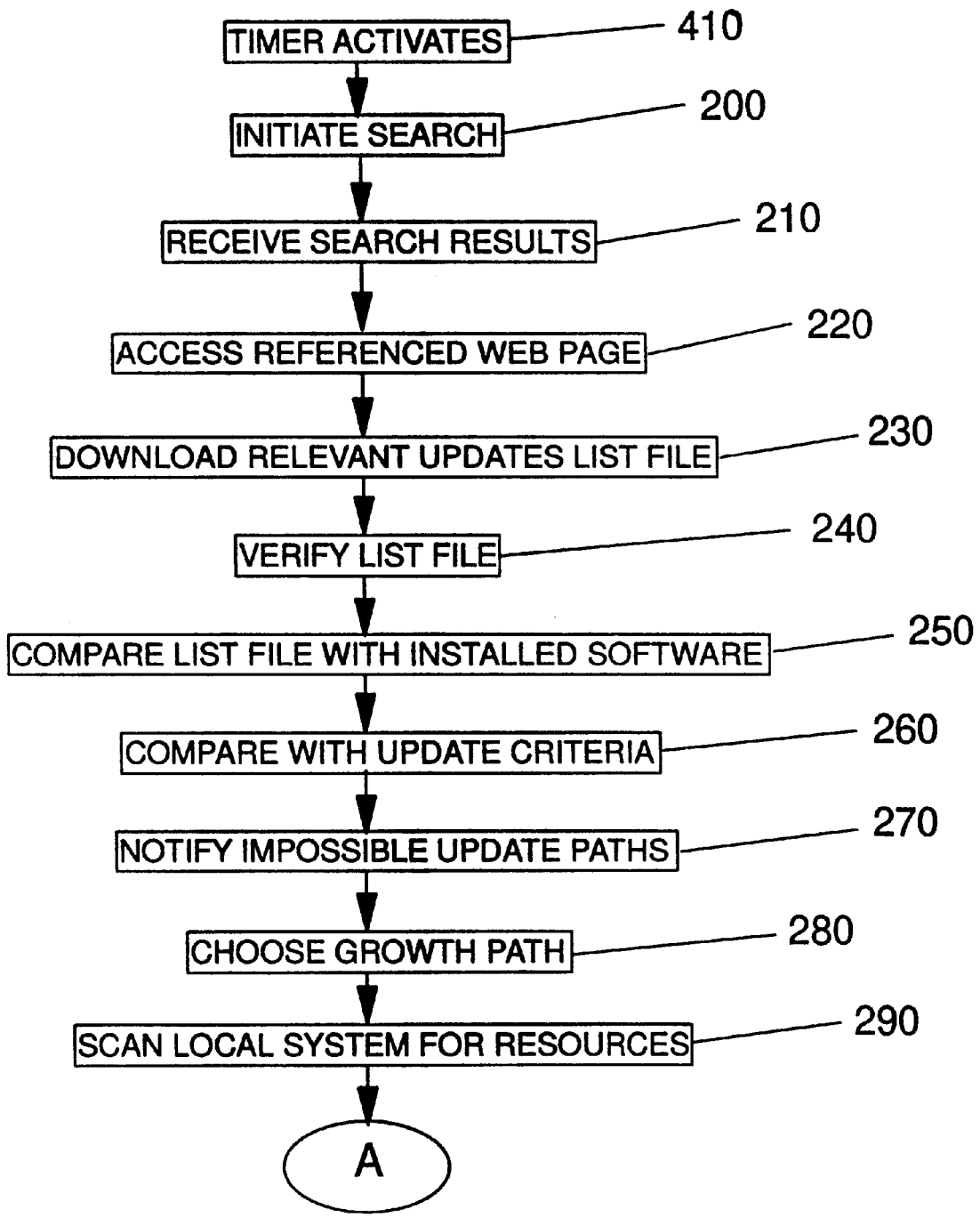
FIG. 4 is a further representation of the sequence of operations of an updater component.
Figure 4B:
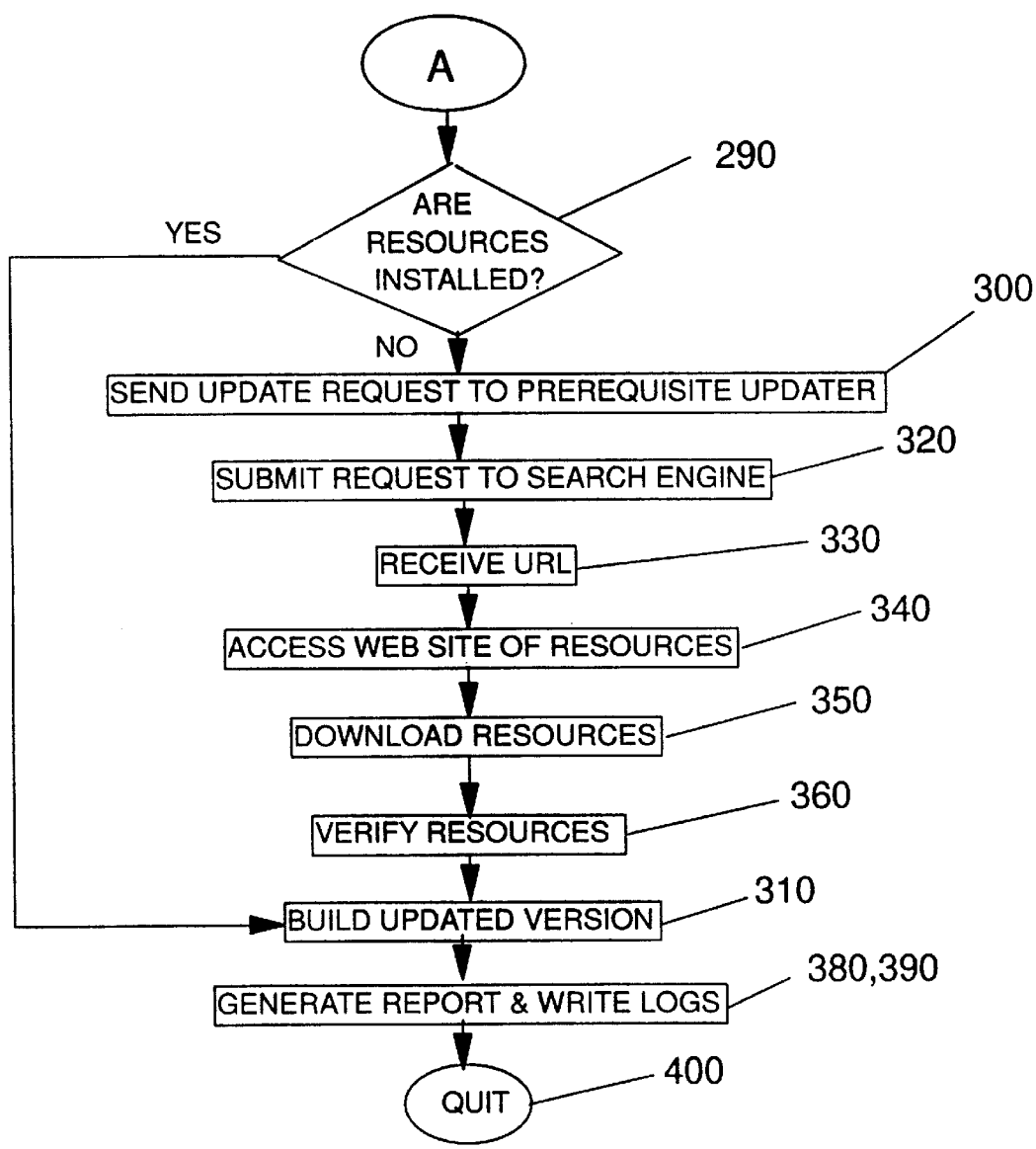

As shown in FIGS. 3 and 4, if required software resources for building the updated version are not found on the local system, the updater component submits 320 a further request to one or more search engines to find the required resources. The search engine returns 330 one or more URLs and the updater component uses these to retrieve 340,350 the software resources into storage of the local computer system. At this stage, the updater component or the user need not have any knowledge of what corrections or enhancements may be included in the new version—the update criteria determine what type of updates are required such that the user is spared the effort of studying the content of every update. In practice, it is desirable for users to be able to determine the effects of updates and so the software resources for the update include a description of these effects which a user or administrator can read.

As examples, the software product to be updated may be a word processor application program. If the word processor as sold missed certain fonts or did not include a thesaurus, patches may subsequently be made available for adding these features. The updater component has the capability to add these to the word processor, subject to the update criteria.

In alternative embodiments of the invention, the search for required software resources is unnecessary following the initial search for the updates list (or is only necessary where there are pre-requisite software products as well as patches or new versions for the current product—see below). This is because the update software resources required directly by the current product are stored in association with the list of required resources. That is, the list includes a pointer to the network location of the required resources such that a selection of a growth path from the list involves a selection of a pointer to the network location of the required updates (and possibly also pointers to the locations of pre-requisite software products).

A second verification by digital signature checking is performed 360 (see FIG. 4), this time on the downloaded resources. After verifying 360 the legitimacy of the downloaded resources, the updater component automatically builds 310 the installation in the target environment in accordance with the update policy. In practice, this may require information from the user such as an administration password, or a database usage parameter value, but in the preferred embodiment of the invention installing of the downloaded code is automatic in the sense that it does not require the user to know or obtain from elsewhere any installation information and in that it generally enables the user to be freed from making any decisions at run time if the predefined update criteria enable the updater component to automatically apply updates.

It is well known to include machine readable installation instructions encoded in a shell (for example as Script, or an interpretive language such as PERL, or an executable such as setup.exe in the case of applications on Microsoft's Windows (TM) operating system). Updater components according to the invention will download 350 the machine readable instructions together with the relevant software resources and will automatically execute them 310. The updater component thus automatically processes installation instructions, avoiding the input from a person which is conventionally required. The Scripts can be adapted to reuse information gleaned from the first human installer who installed the first version of the updater component (for example, information such as user name and password of application administrator, installation directory, etc).

The method of updating according to the preferred embodiment of the invention requires software vendors to organise the software resources required to build from one product level to another. For example, a move from version 1.1.1 to 1.1.4 would typically include a series of patches to be applied, and the required order of installation if any would advantageously be encoded in machine processable installation instructions. The user is then spared the effort and the risk of human error which are inherent in methods which require the user to control the order of application of fixes and enhancements. The problem of how to migrate from one product level to another is thus dealt with by the software vendor instead of the customer, and updater components can only move to levels supported by the vendor (i.e. those growth paths published by the software vendor for a specific existing product level).

The updater generates 380 a report and writes 390 to log records, and then quits execution 400 (in the preferred embodiment the updater goes into a sleep or idle state) until activated again 410 upon expiry of a predetermined update cycle period (the repeat period parameter is configured when the updater component is installed).

Structure of Updater Component

The structure of an updater component comprises data, methods for operating on that data, and a public application programming interface (API) which allows other updater components to contact and communicate with it. This structure will now be described in detail.

UPDATER COMPONENT DATA:

The updater component includes the following persistent data:

Product_ID: an identifier of the software product which is managed by this updater component Current_Installed_Version: a version identifier for the installed software (e.g. version 3.1.0)

Current_License: a version identifier corresponding to the software product version up to which the current software license allows the user to upgrade (e.g. version 4.0.z). Alternatively, this may be a licence identifier (e.g. LIC1) for use when accessing machine readable licence terms.

Installation_Environment:

a list of attribute name/attribute value pairs.

This is used by the updater component to store values entered by the user when the updater was used for the first time. For example, the updater installation userid and password, possibly the root password, the installation directory, the web-proxy server address, search engine URLS, log file name, software asset manager e-mail address etc. This data will be re-used when subsequent automatic updates are required.

Growth policy parameters:
a. Growth_Cycle: data determining whether the updater component should attempt to update its software product every day, week or month, etc.
b. Growth_Type: data determining whether the updating is limited to bug fixing and enhancements (i.e. patches) only or requires upgrading to the latest release in each growth cycle.
c. Force_Growth: (YES/NO) a parameter determining whether to force other software resources to upgrade if that is a pre-requisite for this software to upgrade. (Some implementations will provide more flexible controls over forcing other software to update than this simple YES/No)
Last_Growth_Time: Date and time when updater component last executed The updater component also includes the following non persistent data:

Possible_Growth_Paths:
transient data representing the available upgrade paths (e.g. version numbers 3.1.d, 3.2.e, 4.0.a)

PRIVATE UPDATER FUNCTIONS:

The updater component logic includes the following methods:

Discover_Possible_Growth_Paths()

Search for Growth_Path information for this software product on the Internet (or Intranet or other network). This search method initiates a search via a standard search engine server. The information returned is a list of newer versions and associated pre-requisite product information.

The Growth_Path information is then reduced in accordance with the Growth policy parameters. For all members in the Growth_Paths list, a check is performed of whether appropriate versions of pre-requisite products are available on the local and/or remote computer. The updater components managing these pre-requisite products are accessed and forced to grow if this is the policy.

If all pre-requisite products exist locally at the correct level, or are available remotely on the network and there is with a "force growth" policy, then identifiers for newer versions of the software product are added to the Possible_Growth_Paths list.

Decide_Growth_Path()

Interpret the growth policy and select a single growth path. Some implementations of the invention will involve user interaction to select the path, for example if there are considerations such as whether to force updates to other programs.

Get_Resources(Parameter: Chosen_Growth_Path)

Given Chosen_Growth_Path (e.g.3.2.0), search for required resources (Parameters Product_ID, Current_Installed_Version, Chosen_Growth_Path), download all resources to local computer. This will include software required for the new version plus machine processable installation instructions.

Install_Resources()

Process installation instructions including installing required files in correct locations, possibly compilation of the files and modifying the configuration of the existing system to accommodate the software, logging all actions to a file (and enabling an "uninstall" method to undo all actions).

Grow()

Initiates methods:

Discover_Possible_Growth_Paths()

if no possible growth paths exist then updater component becomes idle else

Decide_Growth_Path()

Get_Resources(Parameter: Chosen_Growth_Path)

Install_Resources().

Then Growo writes all completed actions to log and finishes execution of the updater component. The updater component becomes idle either until time to check again for new update requirements or until prompted by another updater component to do so.

PUBLIC UPDATER COMPONENT API:

The updater component includes the following public API. These functions would be callable using existing network communications software, such as remote procedure calls, message oriented middleware, ORB (Object request broker), etc.

Get_Release()

This function is called by other updater components and returns the release level of the product managed by this updater component.

Update(new_level)

Other updater components call this function to move the product managed by this updater component to a new level indicated by the new_level parameter value. This will call the private function Grow().

Receive_Event(event details)

When an updater component receives a request to update, it must inform the calling updater component when it has completed the update or otherwise e.g. if it failed for some reason. The updater component performing the update on behalf of another updater component will call this function of the requesting updater component to communicate success of the update or otherwise. Event details can be a string like "product id, new release level, ok" or "product id, new release level, failure".

The automatic handling of the potential problem of unsynchronised pre-requisite products by enabling forcing of updates (or, if forcing of updates is not part of the update policy, sending of notifications to the software asset manager) is a significant advance over prior art update schemes.

Since the updates list file 160 returned to the updater component in response to an initial search includes an identification 130 of pre-requisite software, that information enables the aforementioned examination 290 of the updater component registration database 40,40' to check whether pre-requisite software is available locally or remotely. If it finds all the updater components located locally or remotely, it can be sure that the software pre-requisites are available and it next needs to contact each updater component for each software product to be sure all pre-requisites are at the correct level. If an updater component 20' having a required product identifier for pre-requisite software 30' but not having the required version number is found locally or remotely, and if forcing of updates is the update policy, then the updater component 20 of the first computer program contacts 300 this pre-requisite updater component 20' and requests that it attempt to update its associated pre-requisite software product 30'. This updater component 20' can, if necessary, request other updater components of its pre-requisite software to update their versions, and so on.

If at some stage no relevant updater component is found locally or remotely, then a message is sent to the asset manager to inform him/her of the requirement for a new product in order to grow the associated product further. If at some stage during the chain of updater requests to grow to a new level one updater component fails to move to the required level then this failure is reported back to its calling updater component, prompting failure of that components update operation, and so on back to the updater component which initiated the whole transaction.

Thus, as well as their autonomous behaviour defined by their update criteria, updater components can react to external stimuli such as requests from other updater components.

Example of Update Synchronisation

An example of the implementation of update synchronisation between two products will now be described. This example shows how one updater component can communicate with another to synchronise pre-requisite software so that all products are present and at compatible release levels.

A CORBA (Common Object Request Broker Architecture) ORB (Object Request Broker) is used for location of and communication between two updater components. Using the above public API it is a simple matter for those familiar with the art of CORBA programming to develop communication code so that one updater component can talk to another updater component anywhere on a network. In this example the component updater registration database 40 is a directory or folder available over the network (e.g. via NFS) which contains for each installed updater component a file called "updater-component_name.iop" (iop stands for interoperable object reference).

This file contains a sequence of bytes which can be converted into a reference to the updater component by any updater component which reads the file using for example the CORBA function:

CORBA::Object::_string_to_object() in C++

Furthermore this reference can be to an updater component anywhere on the network as it represents a unique address for the corresponding updater component. When updater component A has manufactured a reference to updater component B then updater component A can call a public API function simply by using, for example, a C++ mapping A→Get_Release() which will then return the value of the release level of the software managed by the A updater component.

In this example we will consider two products—IBM Corporation's DB2 database product and a Query Tool called "Query Builder", on different machines M and N respectively. (Machines M and N could be the same machine; the present example merely shows that they may also be separate). Both products have updater components which use a CORBA ORB architecture as briefly outlined above. An ORB communication daemon is active on participating systems M and N.

Step 1) Registration Phase:

The DB2 Updater Component starts when the operating system starts on system M and immediately creates a file called ibm_db2_updater.iop (according to some naming standard used to aid subsequent searches for the file) in the network file system folder or directory. This directory could be hosted on any machine and not necessarily M or N. The file contains a series of bytes which can be used to manufacture a reference to the updater component.

[pseudocode]
Filehandle=open("/network/filesystem/directory", "ibm_db2_updater.iop");
ReferenceBytes=CORBA::Object::_object_to_string();
Write(FileHandle, ReferenceBytes);
close(Filehandle);

QueryBuilder Updater component starts and writes its registration to the same directory or folder, again in this case calling the file ibm_querybuilder_updater.iop.

At this stage both updater components are active and have registered their presence and location in the network directory.

Step 2).

QueryBuilder attempts to grow from version 1 to version 2 but a prerequisite is DB2 version 2.1 or higher. The following sequence of actions will occur. QueryBuilder is denoted QB and DB2 as DB2.

QB: searches for file ibm_db2_updater.iop (file name manufactured according to standard) in network directory. It finds the file, reads it and converts it to a usable reference.

[pseudocode]
if (dbref=CORBA::Object::_string_to_object(readfile(ibm_db2_updater.iop)))
 then SUCCESS we have connected to the updater else
 FAIL: Prerequisite software does not exist in set of collaborating systems—send e-mail to software asset manager to notify situation.

Give up on trying to grow to new version.
endif.
Step 3).

At this stage we know that DB2 exists somewhere in our set of networked computers. Now we need to know if it is at the right level. We simply do this by executing its public API function Get_Release() defined above, from within the QB updater, the QB updater is therefore a client requesting the DB2 updater to do something for it, i.e. tell it what release it is.
[pseudocode]
db2_release=dbref→Get_Release();

Let us say this returns the value "2.0".
Step 4)
Client Side:

The QB Updater Component knows that this is not sufficient, it requires version 2.1. It examines its Force_Growth parameter which is, for example, "YES" meaning it should force pre-requisite software to grow to the level required before it can perform its own update procedure. Therefore the QB updater tells the DB2 updater to grow to the new release, and then waits until the pre-requisite has grown to the new release or failed in doing so.
[pseudocode]
dbref→Update("2.1", QBref); // QBref is a ready made reference to the // QB Updater. It is passed to the DB2 updater so that // it can quickly send the results, success or failure, // when the DB2 Updater has finished trying to update // itself.
EVENT=null;
While (EVENT equals null)
    {do nothing;}
if (EVENT equals "SUCCESS")
    then attempt to grow software managed by this updater component i.e. Query Builder.
else
    Write failure to log;
    do not attempt to grow;
    go to sleep and try later;
endif.
Server Side:

The DB2 Updater component receives the request to grow. Which it attempts to do.

It reports the result to the calling client (it knows how to contact the calling client as it is receives a reference to the caller in the function call.)
[pseudocode]
DB2 attempts to grow.
if Growth Successful then
    QBRef→Receive_Event("SUCCESS"); // Note the implementation of the // function Receive_Event simply sets the variable // called EVENT in the QB Updater component to the // value of the parameter passed in the API call, i.e. // "SUCCESS" if in this section of the IF statement.
else
    QBREF→Receive_Event("FAILURE");
end if As noted previously, predefined update criteria may determine which of an available set of updates should be applied and which should be disregarded. The update criteria may include an instruction to the updater component to send a notification to the end user or system administrator when a software update is identified as being available but applying this update is not within the update policy or is impossible. One of the examples given previously is that the update policy may be not to install full replacement versions of software products since that may require upgrading of pre-requisite software products or migration of data (for example if the software product is a database product), whereas it may be intended policy to install any error-correction patches. Notification rather than automatic installation of updates may also be implemented where to upgrade one product to a new version would require upgrading of other pre-requisite complementary products.

The update policy can also determine the degree of automation of the updating process, by defining the circumstances in which the updater requests input from the user or administrator.

The execution of a particular example updater component will now be described in more detail by way of example. This updater component's function is to keep an installed product called "Test" totally up-to-date with all released patches, but not to install replacement versions of Test. Firstly, the updater component is configured with the following data instantiations:

Product_ID: Test
Current_Installed_Version: 1.0.a
Current_License: LIC1
Installation_Environment:"USERID:TestOwner, USERPASSWORD:easy"
"INSTALLPATH: /usr/bin/testapp/"
Growth_Cycle: weekly
Growth_Type: patches, latest, automatically
Force_Growth: no
Last_Growth_Time: Monday Aug. 10, 1997.

The updater then executes weekly, for example each Monday night at 3 am (it is the system administrator who decides the timing).

The following represents a possible execution trace for this example updater component.

Example Execution Trace

Step 1) The Growth Cycle Starts:
>>>> START: Discover_possible_Growth_Paths()
* Execute search on remote search engine (e.g. Internet Search Engine) using Phrase ("IBM Test 1.0.a Growth Paths")
Search returns URL published by software vendor outlining current growth paths for product;
* Download URL:
File contents are:
"1.0.b,none; 2.0, other_required product_product_id 1.0.c;"
* Authenticate URL file using hashing algorithm and digital signature.
If not authentic, return to search for another URL matching criteria
* Build growth_path_list: growth_path list="1.0.b, none;
2.0, other_required_product_id 1.0.c;"
* Remove all but patch level increases (according to Growth_Policy) from Growth_path list (i.e. only those with the first version and second release number matching 1.0).
* growth_path list="1.0.b, none;"
* For all members in list, ensure prerequisites exist. In this example, all members of list meet this criteria trivially.
* Place candidate growth_paths into Possible_Growth_Paths list=1.0.b <<<< END: Discover_possible_Growth_Paths()
Step 2) Next the updater component decides on the Growth Path to pursue:
>>>> START Decide_Growth_Path()
* The growth policy dictates that we should grow to latest patched
revision. (In this example, determining the latest revision is trivial i.e. it is 1.0.b)
* chosen_growth_path=1.0.b
<<<< END: Decide_Growth_Path()
Step 3) The updater component then obtains the required resources to revise the current software level to the new one.
>>>> Get_Resources()
* Execute search on remote search engine (e.g. Internet Search Engine) using Phrase ("IBM Test REVISION 1.0.a to 1.0.b
RESOURCES").
* Search returns URL say
ftp://ftp.vendor-site/pub/test/resources/1.0.a-b"
* Updater downloads file pointed to by URL and places in secure holding area where it verifies authenticity.
* Updater verifies authenticity (using, for example, digital signatures based on RSA algorithm, or any method)
If files not authentic, then return to search (see Note 1 below)
* Updater unpacks resources into a temporary directory (see Note 2
below). These resources include machine processible installation
instructions (for example, instructions written in a script language such as a UNIX shell script or MVS REXX) and files
(either binary or requiring compilation) which actually contain
the software fix.
<<<< END: Get_Resources()
Notes on above tasks
Note 1—To save time the updater looks for a standard file before downloading the URL called "signature", which contains the URL
ftp://ftp.vendor-site/pub/test/resources/1.0.a-b and a listing of its contents. This is hashed and signed. Using this signature, the Updater component can quickly establish authenticity of the URL (to some extent) before downloading it and use the information i.e. file listings to corroborate the final downloaded resources after they have been unpacked into the temporary directory. When the final URL is downloaded it is also checked again for authenticity (to guard against someone placing a bogus artefact in an authentic URL location).
Note 2—Part of the unpacking is that the updater component will examine the installation scripts and modify them based on the contents of its installation environment data where required. For example if the installation instructions were coded in a shell script it will replace all instances of INSTALLPATH with the token "/usr/bin/testapp/". Again Naming conventions of attributes are standardised as it the method of token substitution in installation instructions. This makes totally automatic installation possible.
Step 4) The updater component then implements the actual software upgrade:
>>>> START Install_Resources()
* execute the installation instructions.
* update the values of
Current_Installed_Version=1.0.b
Last_Growth_Time =Date+Time.
* send an e-mail to software asset manager informing of installation and whether or not a reboot of the Operating System
or restart of the application is required before the upgrade takes affect.
<<<< END Install_Resources()
This is the end of this current growth cycle. The seed updates the Last_Growth_Time value the current time and then exits. The time taken for this cycle could be anything from a few seconds where the updater component found no upgrade paths for the currently installed version to several hours if a totally new release from the current one is to be downloaded and installed together with new pre-requisite software.

An alternative to the embodiment described above in detail does not require an independent updater component for every different software product, but uses a single generic updater component installed on a system together with product-specific plug-in objects and instructions which are downloaded with each product. These objects interoperate with the generic code to provide the same functions of the product-specific updater components described above. It will be clear to persons skilled in the art that the present invention could be implemented within systems in which some but not all application programs and other software products installed on the system have associated updater components, and that other changes to the above-described embodiments are possible within the scope of the present invention.

What is claimed is:

1. A computer program product, comprising computer program code recorded on a computer readable recording medium, the computer program code comprising an updater component for use in updating one or more computer programs installed on a computer system connected within a computer network, the updater component including:

means for initiating access to one or more identifiable locations within the network where one or more required software update resources are located, to retrieve the required software update resources;

means for performing a comparison between software update resources available from said one or more identifiable network locations and computer programs installed on said computer system, to identify available relevant update resources, and for comparing the available relevant update resources with predefined update criteria corresponding to applicable software licence terms and conditions;

means for initiating retrieval of software update resources which satisfy said predefined criteria; and means for applying a software update to one of the installed computer programs using the one or more retrieved software resources.

2. A computer program product according to claim 1, wherein said means for applying software updates includes means for installing available relevant software resources in accordance with the predefined update criteria and in accordance with computer readable instructions for installation which are part of the software resources downloaded for the update.

3. A computer program product according to claim 1, wherein information for identifying one or more locations is held by said updater component and includes a product identifier of a computer program product, the updater component being adapted to provide said product identifier to a search engine, the product identifier serving as a search parameter for use by said search engine to identify network locations.

4. A computer program product according to claim 3, wherein said updater component is adapted to download a list of available software update resources and their pre-requisite software products in response to said search engine identifying network locations at which said list is held, to compare the list of available software update resources and pre-requisite products with computer programs installed on said computer system and, where updates to the pre-requisite products are required, to request updates to the pre-requisite products.

5. A computer program product according to claim 1, wherein the updater component has machine readable installation instructions for installing the updater component on a computer system, the installation instructions including instructions for registering the updater component with a repository which is accessible by other updater components, such that the updater component is identifiable and contactable by other updater components.

6. A computer program product according to claim 5, wherein the updater component includes an API via which updater components of complementary computer programs can request that the current updater component update its computer program, the current updater component being adapted to call an update method to update its computer program in response to an update request, and wherein the current updater component is adapted to send a system-generated request to updater components of pre-requisite computer programs of its computer program when updating of its computer program requires updating of said pre-requisite computer programs.

7. A computer program product according to claim 12, wherein said means for applying updates is adapted to install correction and enhancement software which modifies existing installed software and also to install upgraded versions of installed software which replaces installed software.

8. A method for automated updating of a computer program installed on a computer system connected within a computer network, including the following steps:
   delivering to the computer system an updater component for use in updating the computer program;
   providing at a first network location downloadable software resources for building said computer program from a current version to an updated version;
   wherein the updater component is adapted to perform the following steps when executed on the computer system:
      (a) initiating access to said first network location at which said software resources are located;
      (b) performing a comparison between software resources available from said first network location and the installed computer program, to identify available relevant update resources, and comparing the available relevant update resources with pre-defined update criteria corresponding to applicable software licence terms and conditions;
      (c) downloading onto said computer system the available relevant software update resources which satisfy the predefined update criteria;
      (d) building said computer program from the current version to the updated version using the downloaded software resources.

9. A method according to claim 19, including providing at a second network location, identifiable from information in the updater component, a computer readable list of available updates to said computer program, wherein the updater component is adapted to perform the following steps prior to accessing said first network location:
   initiate access to said second network location to retrieve said list;
   read said list and perform a comparison of the listed available updates with said computer program on said first computer system, thereby to identify the available relevant update resources.

* * * * *

UNITED STATES PATENT AND TRADEMARK OFFICE
CERTIFICATE OF CORRECTION

PATENT NO. : 6,199,204 B1
DATED : March 6, 2001
INVENTOR(S) : Seamus Donohue

It is certified that error appears in the above-identified patent and that said Letters Patent is hereby corrected as shown below:

<u>Title page,</u>
Item [75], change item [75] from "Inventor: Seamus Donohue, Artane (IR)" to
-- Inventor: Seamus Donohue, Dublin, Ireland --.

Signed and Sealed this

Twenty-fourth Day of September, 2002

Attest:

JAMES E. ROGAN
*Attesting Officer*  *Director of the United States Patent and Trademark Office*